United States Patent
Robinson et al.

(10) Patent No.: US 10,183,252 B2
(45) Date of Patent: Jan. 22, 2019

(54) BASE METAL CATALYST FOR TREATMENT OF OZONE AND VOLATILE ORGANIC COMPOUNDS PRESENT IN AIR SUPPLY

(71) Applicant: BASF Corporation, Florham Park, NJ (US)

(72) Inventors: David M. Robinson, Princeton, NJ (US); Mark T. Buelow, Phillipsburg, NJ (US); Laif R. Alden, Feasterville, PA (US); Michael Durilla, Howell, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 15/522,931

(22) PCT Filed: Oct. 29, 2015

(86) PCT No.: PCT/US2015/057976
§ 371 (c)(1),
(2) Date: Apr. 28, 2017

(87) PCT Pub. No.: WO2016/069856
PCT Pub. Date: May 6, 2016

(65) Prior Publication Data
US 2017/0333842 A1    Nov. 23, 2017

Related U.S. Application Data

(60) Provisional application No. 62/072,738, filed on Oct. 30, 2014.

(51) Int. Cl.
*B01D 53/86*    (2006.01)
*B60H 3/06*    (2006.01)
(Continued)

(52) U.S. Cl.
CPC ..... *B01D 53/8675* (2013.01); *B01D 53/8687* (2013.01); *B01J 23/02* (2013.01);
(Continued)

(58) Field of Classification Search
CPC .... A61L 9/00; A61L 2209/00; A61L 2209/10; A61L 2209/20; A61L 2209/212;
(Continued)

(56) References Cited

U.S. PATENT DOCUMENTS

| 4,585,625 A | 4/1986 | Chadwick et al. |
| 5,204,309 A | 4/1993 | Vorob'iev et al. |

(Continued)

FOREIGN PATENT DOCUMENTS

| DE | 4007965 A1 | 9/1991 |
| WO | 2011019779 A2 | 2/2011 |

OTHER PUBLICATIONS

PCT, International Preliminary Report on Patentability and Written Opinion of the International Searching Authority for International Application No. PCT/US2015/057976, dated May 11, 2017, 20 pages.

*Primary Examiner* — Timothy C Vanoy
(74) *Attorney, Agent, or Firm* — Lowenstein Sandler LLP

(57) ABSTRACT

Disclosed herein are base metal catalyst devices for removing ozone, volatile organic compounds, and other pollutants from an air flow stream. A catalyst device includes a housing, a solid substrate disposed within the housing, and a catalyst layer disposed on the substrate. The catalyst layer includes a first base metal catalyst at a first mass percent, a second base metal catalyst at a second mass percent, and a support material impregnated with at least one of the first base metal catalyst or the second base metal catalyst. The preferred catalyst composition is a combination of manganese oxide and copper oxide.

20 Claims, 8 Drawing Sheets

(51) Int. Cl.

| | | |
|---|---|---|
| *B01J 3/06* | (2006.01) | |
| *B01J 23/889* | (2006.01) | |
| *B01J 35/04* | (2006.01) | |
| *B01J 23/72* | (2006.01) | |
| *F24F 3/16* | (2006.01) | |
| *B01J 37/02* | (2006.01) | |
| *B01J 23/02* | (2006.01) | |
| *B01J 35/00* | (2006.01) | |
| *B01J 35/10* | (2006.01) | |
| B01J 23/14 | (2006.01) | |
| B01J 23/20 | (2006.01) | |
| B01J 23/24 | (2006.01) | |

(52) U.S. Cl.
CPC ........... *B01J 23/72* (2013.01); *B01J 23/8892* (2013.01); *B01J 35/0013* (2013.01); *B01J 35/04* (2013.01); *B01J 35/1014* (2013.01); *B01J 35/1019* (2013.01); *B01J 35/1023* (2013.01); *B01J 35/1028* (2013.01); *B01J 35/1038* (2013.01); *B01J 35/1042* (2013.01); *B01J 35/1047* (2013.01); *B01J 37/0221* (2013.01); *B60H 3/0658* (2013.01); *F24F 3/16* (2013.01); *F24F 3/1603* (2013.01); *B01D 2255/207* (2013.01); *B01D 2255/2073* (2013.01); *B01D 2255/20761* (2013.01); *B01D 2255/9207* (2013.01); *B01D 2257/2064* (2013.01); *B01D 2257/30* (2013.01); *B01D 2257/306* (2013.01); *B01D 2257/402* (2013.01); *B01D 2257/502* (2013.01); *B01D 2257/504* (2013.01); *B01D 2257/708* (2013.01); *B01D 2258/06* (2013.01); *B01D 2259/4508* (2013.01); *B01D 2259/4566* (2013.01); *B01D 2259/4575* (2013.01); *B01J 23/14* (2013.01); *B01J 23/20* (2013.01); *B01J 23/24* (2013.01); *F24F 2003/1628* (2013.01); *F24F 2003/1657* (2013.01); *Y02A 50/235* (2018.01); *Y02C 20/10* (2013.01)

(58) Field of Classification Search
CPC ... B01J 23/34; B01J 23/72; B01J 23/00; B01J 37/00; B01D 2255/00; B01D 2255/2073; B01D 2255/20761; B01D 2255/9022; B01D 2257/106; B01D 2257/708
See application file for complete search history.

(56) References Cited

U.S. PATENT DOCUMENTS

| | | | | |
|---|---|---|---|---|
| 5,232,886 | A  * | 8/1993 | Yoshimoto | B01D 53/8675 |
| | | | | 502/185 |
| 6,096,277 | A  * | 8/2000 | Campbell | B01D 53/864 |
| | | | | 423/219 |
| 6,121,189 | A  * | 9/2000 | Campbell | B01D 53/864 |
| | | | | 502/324 |
| 6,517,899 | B1 | 2/2003 | Hoke et al. | |
| 8,435,482 | B2 * | 5/2013 | Hutchings | B01D 53/864 |
| | | | | 423/593.1 |
| 8,668,890 | B2 | 3/2014 | Tran et al. | |
| 2003/0207760 | A1* | 11/2003 | Allen | B01D 53/864 |
| | | | | 502/324 |
| 2009/0227195 | A1 | 9/2009 | Buelow et al. | |
| 2010/0266473 | A1 | 10/2010 | Chen et al. | |
| 2010/0310441 | A1 | 12/2010 | Lapadula et al. | |
| 2011/0038771 | A1* | 2/2011 | Buelow | B01D 46/526 |
| | | | | 423/210 |
| 2015/0352530 | A1 | 12/2015 | Nagao et al. | |

* cited by examiner

US 10,183,252 B2

BASE METAL CATALYST FOR TREATMENT OF OZONE AND VOLATILE ORGANIC COMPOUNDS PRESENT IN AIR SUPPLY

CROSS REFERENCE TO RELATED APPLICATION

This application is a national stage entry under 35 U.S.C. § 371 of International Application No. PCT/US2015/057976, filed Oct. 29, 2015, which claims the benefit of priority of U.S. Provisional Patent Application No. 62/072,738, filed Oct. 30, 2014, which are hereby incorporated by reference herein in their entireties.

TECHNICAL FIELD

The present disclosure relates to devices and methods that utilize catalysts for air purification. More particularly, the disclosure relates to base metal catalyst layers for removing ozone and volatile organic compounds from air supplies.

BACKGROUND

Atmospheric pollution is a concern of increasing importance as the levels of various atmospheric pollutants continue to increase. One primary pollutant of concern is ozone. Ozone is a molecule that consists of three oxygen atoms. Naturally-occurring ozone is formed miles above the earth in the stratosphere. This ozone layer is responsible for absorbing the majority of the sun's harmful ultraviolet radiation. Ground level ozone is produced by the reactions of nitrogen oxides and volatile organic compounds in the presence of direct sunlight. The main sources of nitrogen oxide and volatile organic compound gases are mobile emissions, industrial factories, electrical plants, chemical solvents, and gasoline vapors.

Near the stratosphere, aircraft may be affected by various pollutants. For example, aircraft environmental control system ("ECS") supplies periodically contain high levels of ozone and volatile organic compound ("VOC") contaminants that are harmful/undesirable for passengers in the aircraft cabin or cockpit. Current aircraft cabin air catalyst converters contain high levels of precious metal including both palladium and platinum designed for ozone and VOC reduction respectively, which can be considerably costly to produce and maintain.

At the ground level, pollution control is also performed by direct treatment of ozone and other contaminants at ground level utilizing vehicle heat exchangers. In these processes, ozone in the air that passes over catalyst coated surfaces, such as radiators, convert ozone molecules into oxygen molecules. These processes capitalize on the large volume of air that passes through a vehicle's radiator.

There continues to be a need for systems, methods, and compositions for effectively treating pollution at ground level and at high altitudes. These methods and compositions should exhibit long term performance, efficient manufacturing operations, and reduced production costs.

SUMMARY

Disclosed herein are methods, devices, and systems for purifying an air supply of ozone and volatile organic compounds. Also disclosed herein are methods for producing catalyst devices.

In one aspect, a catalyst device includes a housing, a solid substrate disposed within the housing, and a catalyst layer disposed on the substrate. The catalyst layer includes a first base metal catalyst at a first mass percent, a second base metal catalyst at a second mass percent, and a support material impregnated with at least one of the first base metal catalyst or the second base metal catalyst.

In one implementation of the device, the catalyst layer is to remove one or more of ozone, carbon dioxide, carbon monoxide, nitrous oxide, amines, sulfur compounds, thiols, chlorinated hydrocarbons, or volatile organic compounds from an unpurified air supply.

In one implementation of the device, the first base metal catalyst and the second base metal catalyst each comprise at least one of Cu, Fe, Co, Ni, Cr, Mn, Nd, Ba, Ce, La, Pr, Mg, Ca, Zn, Nb, Zr, Mo, Sn, Ta, or Sr. For example, the first base metal catalyst may be copper oxide at a first mass percent between about 1% and about 30%, between about 5% and 15%, or between about 8% and about 12%. As another example, the second base metal catalyst may be manganese oxide at a second mass percent between about 1% and about 30%, between about 5% and 15%, or between about 8 and about 12%.

In one implementation of the device, the support material is an oxygen donating support, which may have a surface area of at least about 50 $m^2/g$, of at least about 100 $m^2/g$, between about 50 $m^2/g$ to about 5000 $m^2/g$, or between about 100 $m^2/g$ to about 300 $m^2/g$. The support material may have a pore volume between about 0.1 cc/g to about 10 cc/g, between about 0.3 cc/g to about 3 cc/g, or between about 0.3 cc/g to about 1.2 cc/g. The support material may be or include a refractory oxide, and may be or include a material selected from the group including ceria, alumina, titania, silica, zirconia, carbons, metal organic framework, clay, zeolites, and combinations thereof.

In one implementation of the device, a density of the catalyst layer may be between about 0.003 $g/in^2$ and about 0.078 $g/in^2$, between about 0.015 $g/in^2$ and about 0.062 $g/in^2$, or between about 0.039 $g/in^2$ and about 0.047 $g/in^2$. A thickness of the catalyst layer may be between about 10 nanometers and about 10 millimeters, between about 500 nanometers and about 1 millimeter, or between about 1 micrometer and about 500 micrometers.

In one implementation of the device, the solid substrate is a nonwoven filter, a paper filter, a ceramic filter, or a fibrous filter. In another implementation of the device, the solid substrate is a metallic foam substrate, a ceramic foam substrate, or a polymer foam substrate. In yet another implementation of the device, the solid substrate is a metallic honeycomb substrate, a ceramic honeycomb substrate, a paper honeycomb substrate, or a ceramic fiber honeycomb substrate. In yet another implementation of the device, the solid substrate is a surface of a heat exchanger, a radiator, a heating core, or a condenser. In yet another implementation of the device, the solid substrate is an HVAC duct, an air filter, or a louver surface.

In one implementation of the device, the catalyst device further includes an inlet port configured to receive unpurified air into the interior of the housing, and an outlet port configured to deliver purified air from the housing. The catalyst device may be configured to contact the received unpurified air with the catalyst layer, in which ozone present in the received unpurified air is converted to oxygen upon contact with the catalyst layer. The received unpurified air may have an initial ozone content, and the purified air may have a final ozone content that is less than the initial ozone content. For example, the final ozone content of the purified air may be less than about 20% of the initial ozone content of the received unpurified air, or less than about 10% of the initial ozone content of the received purified air.

In one implementation of the device, the catalyst device is incorporated into an aircraft environmental control system. The unpurified air may be one or more of recirculated aircraft cabin air, aircraft jet engine bleed air, or non-bleed air. The purified air may be air flowing into a cabin or cockpit of an aircraft.

In one implementation of the device, the catalyst device is incorporated into an automobile. The unpurified air may be air flowing into an automobile ventilation unit. The purified air may be air flowing out of an automobile ventilation unit and into an automobile interior.

In one implementation of the device, the catalyst device is incorporated into a heating, ventilation, and air conditioning (HVAC) system of a building. The unpurified air may be one or more of air from outside of the building or recirculated air from inside of the building. The purified air may be air flowing into the building.

In one implementation of the device, the catalyst device is incorporated into a portable air purifier.

In one aspect, a method for purifying an air flow stream includes contacting an unpurified air flow stream with a catalyst layer to produce a purified air flow stream. The unpurified air flow stream contains a first ozone content, and the purified air flow stream contains a second ozone content that is less than the first ozone content. The catalyst layer includes a first base metal catalyst, a second base metal catalyst, and a support material.

In one implementation of the method, the catalyst layer is disposed on a solid substrate. The solid substrate may be a heat exchanger, and may be part of an automobile ventilation unit. In another implementation of the method, the solid substrate is part of an aircraft environmental control system. In yet another implementation of the method, the solid substrate is part of an HVAC system.

In one implementation of the method, the solid substrate is a nonwoven filter, a paper filter, a ceramic filter, or a fibrous filter. In another implementation of the method, the solid substrate is a metallic foam substrate, a ceramic foam substrate, or a polymer foam substrate. In yet another implementation of the method, the solid substrate is a metallic honeycomb substrate, a ceramic honeycomb substrate, a paper honeycomb substrate, or a ceramic fiber honeycomb substrate. In yet another implementation of the method, the solid substrate is a surface of a heat exchanger, a radiator, a heating core, or a condenser. In yet another implementation of the method, the solid substrate is an HVAC duct, an air filter, or a louver surface.

In one implementation of the method, contacting the unpurified air flow stream with the catalyst layer removes at least one of carbon dioxide, carbon monoxide, nitrous oxide, or a volatile organic compound from the unpurified air flow stream to produce the purified air flow stream.

In one implementation of the method, the first base metal catalyst and the second base metal catalyst each comprise at least one of Cu, Fe, Co, Ni, Cr, Mn, Nd, Ba, Ce, La, Pr, Mg, Ca, Zn, Nb, Zr, Mo, Sn, Ta, or Sr. For example, the first base metal catalyst is copper oxide at a first mass percent of between about 1% and about 30%, between about 5% and 15%, or between about 8% and about 12%. The second base metal catalyst may be manganese oxide at a second mass percent between about 1% and about 30%, between about 5% and 15%, or between about 8% and about 12%.

In one implementation of the method, the support material is an oxygen donating support, which may have a surface area of at least about 50 m$^2$/g, of at least about 100 m$^2$/g, of about 50 m$^2$/g to about 5000 m$^2$/g, or of about 100 m$^2$/g to about 300 m$^2$/g. The support material may have a pore volume of about 0.1 cc/g to about 10 cc/g, of about 0.3 cc/g to about 3 cc/g, or of about 0.3 cc/g to about 1.2 cc/g.

In one implementation of the method, the support material may be or include a refractory oxide, and may be or include a material selected from the group consisting of ceria, alumina, titania, silica, zirconia, carbons, metal organic framework, clay, zeolites, and combinations thereof.

In one implementation of the method, a density of the catalyst layer may be between about 0.003 g/in$^2$ and about 0.078 g/in$^2$, between about 0.015 g/in$^3$ and about 0.062 g/in$^3$, or between about 0.039 g/in$^3$ and about 0.047 g/in$^3$. A thickness of the catalyst layer may be between about 10 nanometers and about 10 millimeters, between about 500 nanometers and about 1 millimeter, or between about 1 micrometer and about 500 micrometers.

In one implementation of the method, the second ozone content of the purified air flow stream may be less than about 20% of the first ozone content of the unpurified air flow stream, or may be less than about 10% of the first ozone content of the received purified air flow stream.

In one implementation of the method, the unpurified air flow stream is one or more of an aircraft jet engine bleed air stream, recirculated aircraft cabin air, or a non-bleed air stream. The purified air flow stream may be air flowing into a cabin or cockpit of an aircraft.

In one implementation of the method, the unpurified air flow stream may be air flowing into an automobile ventilation unit. The purified air flow stream may be air flowing out of an automobile ventilation unit and into an automobile interior.

In one implementation of the method, the unpurified air flow stream may be air flowing into a building from outside of the building, or may be recirculated air from inside of a building flowing into an HVAC system. The purified air flow stream may be air flowing into a building via an HVAC system.

In one implementation of the method, the unpurified air flow stream is air flowing into a portable air purifier.

In one aspect, an aircraft environmental control system includes a housing having a base metal catalyst disposed therein. The system also includes an inlet to receive unpurified air into the housing, in which the unpurified air is at least one of jet engine bleed air or recirculated aircraft cabin air. The system also includes an outlet to deliver ozone-reduced air from the housing and into an interior of the aircraft, in which the ozone-reduced air is produced as a result of contact between the received unpurified air and the base metal catalyst.

In one aspect, a method for producing a catalyst device includes producing or providing a slurry, in which the slurry includes a first base metal catalyst, a second base metal catalyst, a support material, and a binder material. The method further includes depositing the slurry onto a surface of a solid substrate, and calcining the deposited slurry to produce a catalyst layer disposed on the surface of the solid substrate. The solid substrate is placed into an air purification chamber, in which the solid substrate is arranged such that when an air flow is introduced into the air purification chamber, the catalyst layer contacts the air flow and converts ozone in the air flow into oxygen.

The term "atmosphere" means is defined herein as the mass of air surrounding the earth. The term "ambient air" shall mean the atmosphere which is drawn or forced towards the outer surface of a composition or device as disclosed herein.

The term "automobile" means any wheeled or unwheeled motorized machine or vehicle for (i) transporting of passengers or cargo or (ii) performing tasks such as construction or excavation moving. Vehicles can have, e.g., at least 2 wheels (e.g., a motorcycle or motorized scooter), at least 3 wheels (e.g., an all-terrain vehicle), at least 4 wheels (e.g., a passenger automobile), at least 6 wheels, at least 8 wheels, at least 10 wheels, at least 12 wheels, at least 14 wheels, at least 16 wheels or at least 18 wheels. The vehicle can be, e.g., a bus, refuse vehicle, freight truck, construction vehicle, heavy equipment, military vehicle or tractor. The vehicle can also be a train, aircraft, watercraft, submarine or spacecraft.

The term "radiator" means an apparatus to effect cooling to an associated device through heat exchange.

The terms "stream" or "flow" broadly refers to any combination of flowing gas that may contain solid, liquid, or gaseous matter.

The terms "unpurified air" or "unpurified air stream" refers to any stream that contains one or more pollutants at a concentration or content at or above a level considered to have adverse effects on human health (including short term and/or long term effects). Unpurified air may include, but is not limited to, ozone, carbon monoxide (CO), volatile organic compounds (VOCs), methyl bromide, water, and nitrogen.

The terms "purified air" or "purified air stream" refer to any stream that contains one or more pollutants at a concentration or content below a level considered to have adverse effects on human health (e.g., effectively free of pollutants).

The term "support" refers to the underlying high surface area material (e.g., ceria, ceria/zirconia, titania, etc.) upon which additional chemical compounds or elements are carried.

The term "substrate" refers to the monolithic material onto which the support is placed. In some implementations, the substrate may be in the form of a solid surface having a washcoat containing a plurality of supports having catalytic species thereon. A washcoat may be formed by preparing a slurry containing a specified solids content (e.g., 30-50% by weight) of supports in a liquid vehicle, which is then coated onto a substrate and dried to provide a washcoat layer.

BRIEF DESCRIPTION OF THE DRAWINGS

The above and other features of the present disclosure, their nature, and various advantages will become more apparent upon consideration of the following detailed description, taken in conjunction with the accompanying drawings, in which.

DETAILED DESCRIPTION

Figure 1:
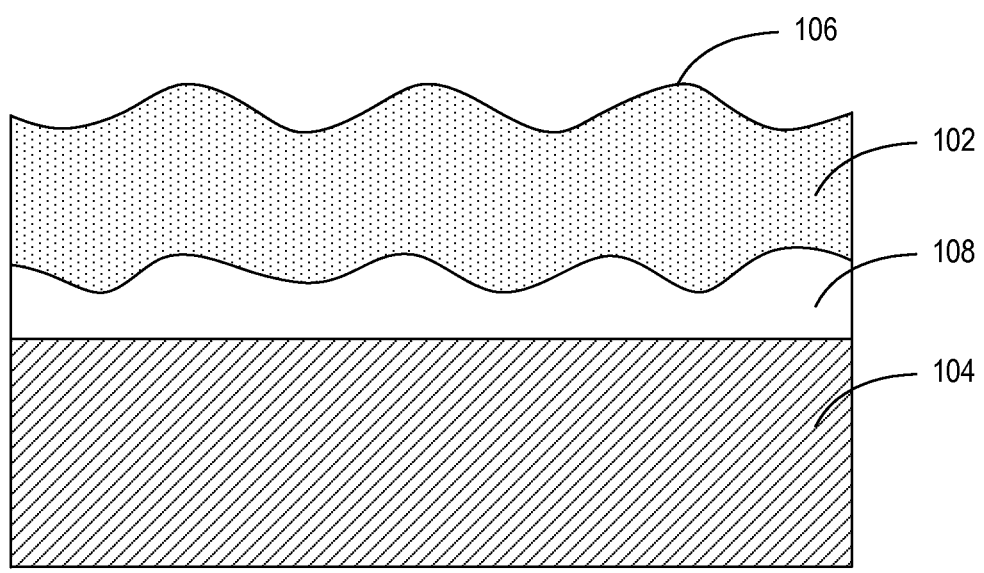
FIG. 1 depicts a cross sectional view of a catalyst layer deposited on a solid support in accordance with an implementation.

The present disclosure relates to the use of base metal only catalysts for the conversion of ozone, hydrocarbons, carbon monoxide, and various VOCs into less harmful compounds such as oxygen, carbon dioxide and water vapor. In certain implementations, a catalyst including magnesium oxide and copper oxide catalysts supported on ceria is shown to convert ozone to oxygen at higher efficiencies than the palladium metal catalyst including VOC conversion functionality without including platinum catalyst.

In one implementation, the disclosure is directed to treatment of aircraft jet engine bleed air for an ECS air supply. For treating aircraft jet engine bleed air, precious metal catalysts meet the high performance demands (>90% conversion at 1,000,000 hr-1 SV and 200 C), and thus have been used exclusively in ECS catalytic converters. The current catalysts for treating aircraft ozone utilize a palladium/manganese catalyst support on a high surface area alumina/silica support with an option to add a platinum catalyst on a high surface area support for additional VOC conversion functionality. However, the levels of precious metal in these catalysts are exceptionally high: 185 to 250 g/ft$^3$ of palladium and optionally 86 g/ft$^3$ of platinum. With the strict performance requirements for ozone conversion mandated by FAA regulations, attempts to reduce cost are typically constrained by ozone conversion performance levels.

The catalysts disclosed herein may be utilized in applications other than treating aircraft ECS air supplies. In one implementation, the disclosure is directed to a surface treatment of a heat exchange device (e.g., an automobile radiator) so that pollutants, such as ozone and VOC, contained in ambient air may be readily converted to less harmful compounds. In one implementation, the disclosure is directed to an HVAC system for treating an air supply provided into the interior of a building in order to remove pollutants, such as ozone and VOC, contained in ambient air.

The flow of ambient air through a heat exchange device, for example, may be treated in accordance with the implementations described herein. In certain aspects of the disclosure, the outer surface of the heat exchange device is capable of catalytically converting pollutants to less harmful compounds without adversely affecting the heat exchange activity of the device. In other aspects of the disclosure, the heat exchanger may provide an acceptable catalytic activity that is maintained over the useful life of the device. In other aspects of the disclosure, the intended activity may be obtained with a single coat of catalytic material onto the substrate (e.g., the heat exchanger).

The various implementations are now described with reference to the following Figures and examples. Before describing several exemplary implementations, it is to be understood that the present disclosure is not limited to the details of construction or process steps set forth in the following description. Other implementations may be practiced or carried out in various ways in accordance with the principles described.

FIG. 1 depicts a cross sectional view of a catalyst layer deposited on a solid support in accordance with an implementation. A catalyst 100 is formed by placing a catalyst layer 102 on a substrate 104, and may include an adhesive layer 108 that adheres the catalyst layer 102 to the substrate 104. The catalyst layer 102 may be porous and may have a high surface area surface 106 that contacts an air flow. The high surface area surface 106 facilitates turbulent air flow in the vicinity of the catalyst layer 102 such to increase the amount of exposure of pollutants within the air flow to the catalyst layer 102. The catalyst layer 102 and the adhesive layer 108 are not shown to scale.

In certain implementations, the catalyst layer 102 is a base metal catalyst. An exemplary base metal catalyst for ozone/VOC conversion includes about 10% manganese oxide by mass and about 10% copper oxide by mass supported on cerium oxide ($CeO_2$), which is also known as ceria. The base metal catalyst is prepared, for example, by generating a slurry having target amounts of copper and manganese salts (e.g., acetate or nitrate based) mixed with both HSA-20 ceria and SBA-150 alumina in a 16:3 ratio. After addition of an alumina binder (Disperal P3), the slurry may then be coated onto a substrate (e.g., the substrate 104) at about 2.75 g/in$^3$ and calcined at about 500° C. Calcining generates the final catalyst layer, which contains about 8.33% manganese oxide and 8.33% copper oxide based on total solids.

In some implementations, a catalyst layer may include multiple layers or "sub-layers" of a catalyst material. Accordingly, it is to be understood that the term "catalyst layer", when referring to a catalyst material that includes different components, may refer to the components distributed within a single layer or the components separated into different layers. For example, a catalyst layer may include a first catalyst layer of a first base metal catalyst (e.g., manganese oxide) and a second catalyst layer of a second base metal catalyst (e.g., copper oxide). The first layer may be disposed on the second layer, or the second layer may be disposed on the first layer.

In some implementations, there may be an overlayer on the catalyst coating or an underlayer between the substrate and the catalyst layer 102. The underlayer or overlayer may be a protective coat, an adhesion layer (e.g., the adhesion layer 108), or an additional catalyst layer. The adhesion layer 108, for example, may be a latex material or an acrylic material. In certain implementations, the catalyst layer 102 is adhered directly to the substrate 104 without the use of the adhesion layer 108. The protective coat may contain a protective substance which is stable at elevated temperatures (e.g., up to 120° C.) and may be resistant to chemicals, salts, dirt and other contaminants which may adversely affect the catalyst composition. The protective material may be, e.g., a plastic or polymeric material such as polyethylene, polypropylene, polytetrafluoroethylene, styrene acrylic or a combination thereof.

The catalyst layer 102 may have a dispersion of catalyst, for example, of from about 50% to about 95% or from about 60% to about 80% of manganese oxide and/or copper oxide crystallite domains measured less than 30 nm using the primary crystallite dimension of the domains within the high surface area support structure based on transmission electron microscopy.

In other implementations, the catalyst layer 102 may have a dispersion of catalyst, for example, of from about 50% to about 95% or from about 60% to about 80% of manganese oxide and/or copper oxide crystallite domains measured less than 15 nm using the primary crystallite dimension of the domains within the high surface area support structure based on transmission electron microscopy.

In certain implementations, the catalyst layer 102 is a physical mixture of metal oxide catalysts particles and high surface area support particles such that separate domains of metal oxide and support can function independently as catalyst and aging protection, respectively.

In certain implementations, the catalyst layer 102 is an alloy of metal oxide catalysts and high surface area support such that the function of each material is inseparable from the other.

In certain implementations, the catalyst 100 is a high surface area support particle which is in surface contact either within the pore structure and/or externally with small (<100 nm) domains of metal oxide catalysts such that separate domains of metal oxide can function independently as catalyst and are provided protection from aging mechanisms within the support material.

In certain implementations, the catalyst 100 is a high surface area support particle which is externally coated with a porous shell structure of metal oxide catalyst material such that the metal oxide catalyst function is external to the support providing a high surface area interior to the composite particle.

In certain implementations, the catalyst 100 is a high surface area support which is encompassing a metal oxide particle in a coating layer such that the metal oxide catalyst is entirely surrounded by a protective high surface area support material.

In certain implementations, the catalyst layer 102 has a relatively high thermal conductivity while maintaining pollutant destruction efficiency. In one aspect of the disclosure, high thermal conductivity materials (e.g., in the form of particles) may be blended into the coating to provide or enhance the thermal conductivity property of the coating without significantly impacting on diffusion through the coating. Non-limiting examples of such materials include metals such as aluminum, graphite, silicon carbide and sapphire. The material can be in the form of particles (e.g., flakes). The particle size may be any suitable size. In one implementation, the particles are on the order of the size of the catalyst and/or no more than the desired thickness of the coating. For example, the particles may have a mean size from about 1 micron to about 30 microns, or from about 1 micron to about 10 microns. The materials (e.g., particles) may be including in the coating in an amount of from about 1% to about 50% by weight of the total coating.

Figure 2:
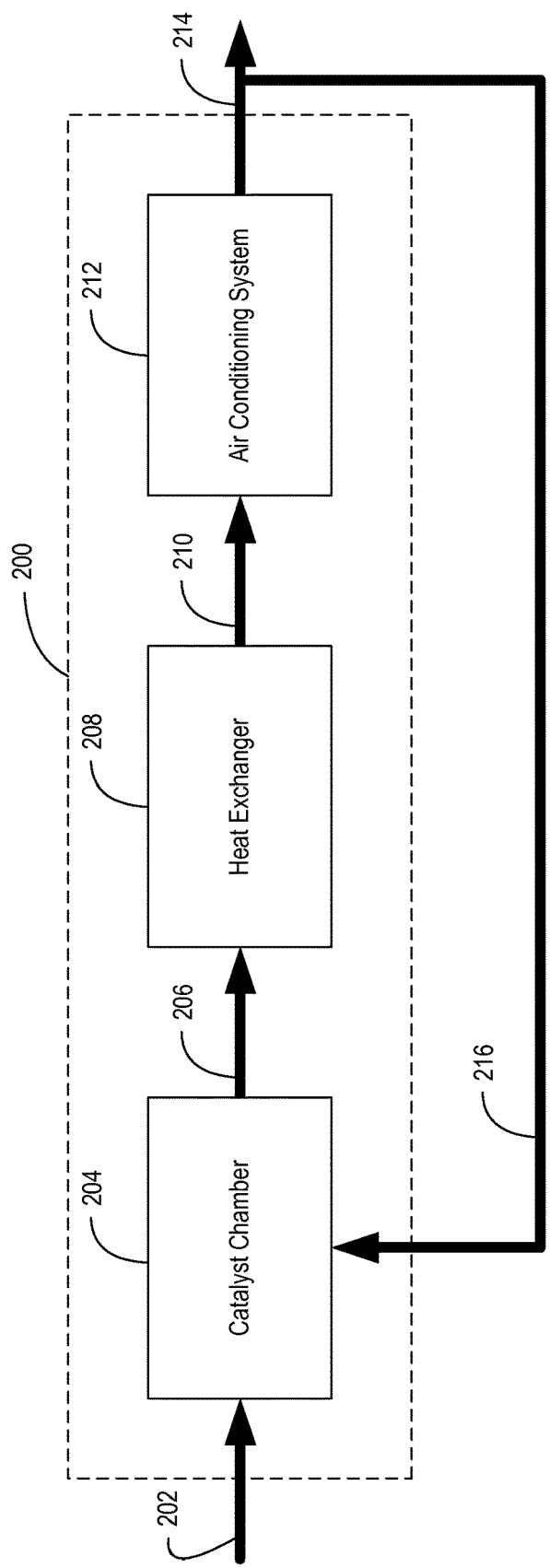
FIG. 2 depicts a block diagram illustration of an aircraft environmental control system ("ECS") in accordance with an implementation.

FIG. 2 shows an exemplary aircraft environmental control system ("ECS"). The ECS 200 includes a catalyst chamber 204, a heat exchanger 208, and an air conditioning system 212. The ECS 200 receives air, such as bleed air 202 from the aircraft's engine. Bleed air 202 may be compressed air received by the catalyst chamber 204. In some implementations, non-bleed air may be received by the catalyst chamber 204 in lieu of bleed air 202 or concurrently with bleed air 202. The catalyst chamber 204 serves as a housing for a catalyst layer disposed within, and may be located, for example, in a lower portion of the aircraft between an air intake for the bleed air 202 and the heat exchanger 208. The interior walls of the catalyst chamber may be lined with a base metal catalyst material (e.g., the catalyst layer 102 described with respect to FIG. 1), such that when an air flow into the catalyst chamber 204 contacts the catalyst material, pollutants, such as ozone and volatile organic compounds, are removed or converted. For example, a base metal catalyst capable of converting ozone to oxygen, as described herein, may line the interior walls of the catalyst chamber 204.

In some implementations, the interior of the catalyst chamber 204 may include a tortuous flow air flow path in order to promote mixing of air within the catalyst chamber 204 and increase the amount of exposure of the air-borne pollutants to the catalyst material. In some implementations, precooling unit may also be included and located upstream relative to the catalyst chamber 204. The precooling unit may lower the temperature of air entering the catalyst chamber 204 prior to conversion or removal of ozone and other pollutants.

The heat exchanger 208 receives purified air 206, where the purified air is cooled to or near to ambient temperatures. The heat exchanged air 210 is then received by the air conditioning system 212, which regulates the temperature of the air to deliver cabin-ready air 214 into the cabin of the aircraft. In some implementations, the air conditioning system 212 also regulates the humidity of the cabin-ready air by including a water extraction unit. In some implementations, recirculated cabin air 216 is flowed from the cabin and back into the catalyst chamber 204.

In some implementations, the interior walls of various passageways are coated with the catalyst material, as well as the interiors of the heat exchanger 208 and air conditioning system 212. In some implementations, one or more of the heat exchanger 208 and the air conditioning system 212 may be consolidated into the catalyst chamber 204.

In some implementations, a catalyst device is incorporated into an aircraft fuel tank inerting system (FTIS). Unpurified air received by the catalyst device may be one or more of recirculated aircraft cabin air, aircraft jet engine bleed air, or non-bleed air. Purified air may be directed to flow into an air separation component of the FTIS or an ullage of the fuel tank.

Figure 3A:
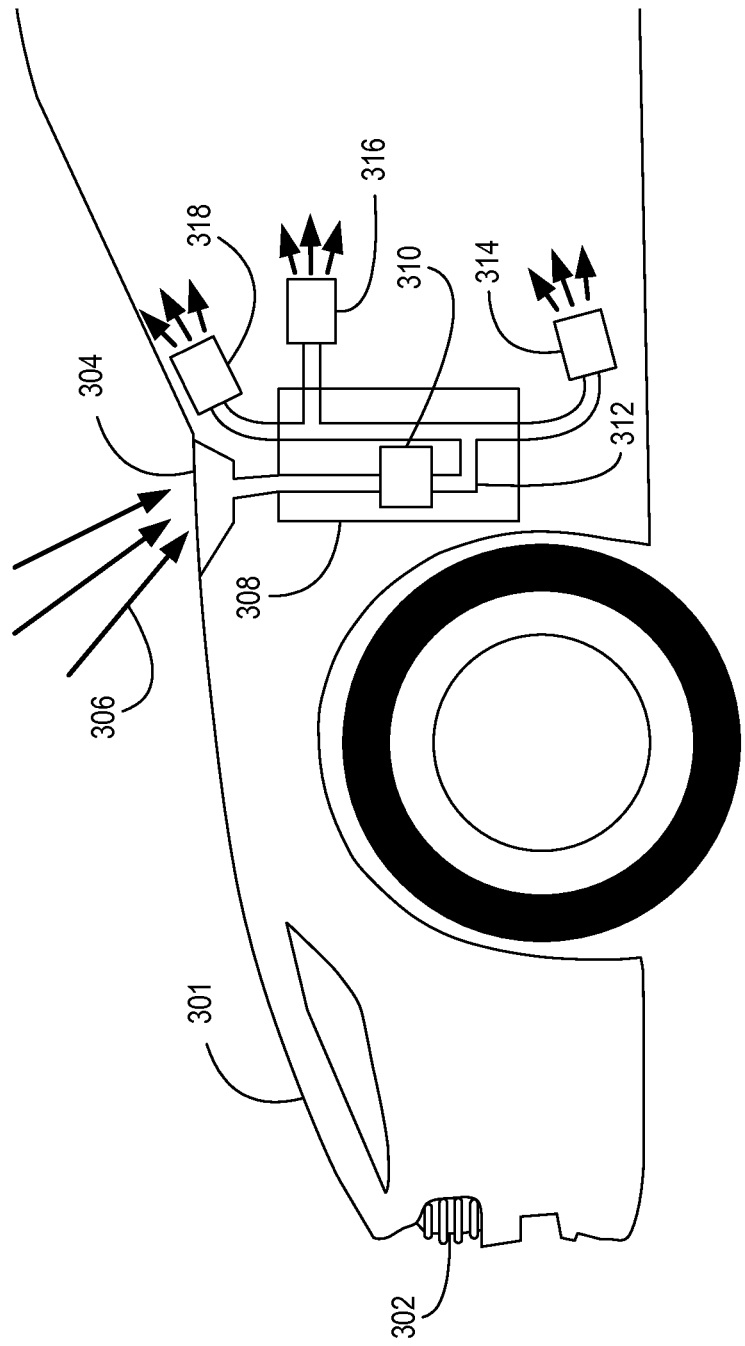
FIG. 3A depicts a side cross-sectional view of an automobile ventilation system in accordance with an implementation.

FIG. 3A depicts a side cross-sectional view of an automobile ventilation system in accordance with an implementation. An automobile frame 301 supports a grille 302 for air inlet, which is located at a front end of the automobile. The frame 301 also supports an air inlet 304 for delivering air into the interior of the automobile. Unpurified ambient air 306 is received by an air ventilation unit 308 via the air inlet 304, and passes into a filter unit 310. The filter unit 310 may include air filters to remove particulars from the ambient air 306, and may also serve as a catalyst device housing. For example, the interior walls of the filter unit 310 may be coated with a base metal catalyst layer (e.g., the catalyst layer 102 described with respect to FIG. 1) in order to remove pollutants, such as ozone and volatile organic compounds. Portions of filtration components within the filter unit 310 may also be lined with a base metal catalyst layer.

Purified air passes through an outlet 312 and into the interior of the automobile via a face vent 316, a demister vent 318, and a foot-well vent 314. In some implementations, the interior walls of the air outlet 312 and each of the vents 314, 316, and 318 may be lined with a base metal catalyst to further purify the air delivered into the automobile of pollutants.

Figure 3B:
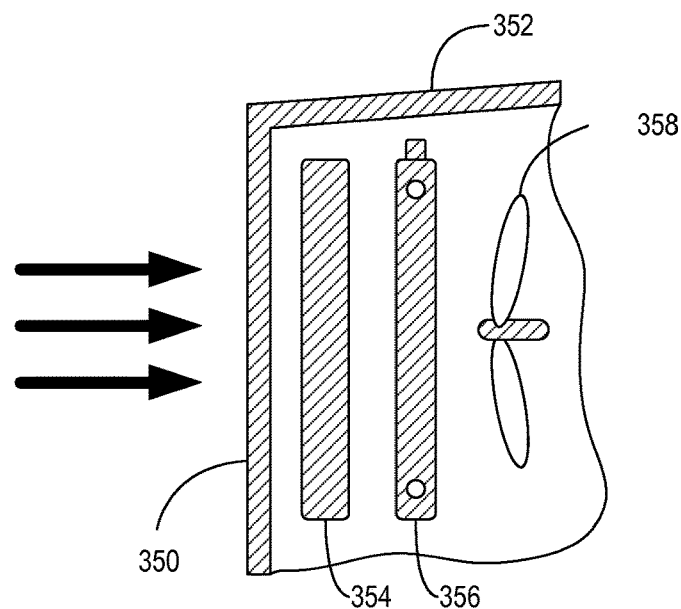
FIG. 3B depicts a side cross-sectional view of an automobile radiator-air conditioning condenser assembly in accordance with an implementation.

FIG. 3B depicts a side cross-sectional view of an automobile radiator-air conditioning condenser assembly in accordance with an implementation. The automobile includes a frame 352, which may be the same as the frame 301 described with respect to FIG. 3A. A front end of the automobile has a grille 350, which may be the same as the grille 302 described with respect to FIG. 3A, and which is supported on the front of the frame 352. An air conditioner condenser 354, a radiator 356, and a radiator fan 358 may be located within the frame 352. One or more of these components may be coated with the base metal catalyst layers disclosed herein.

Figure 3C:
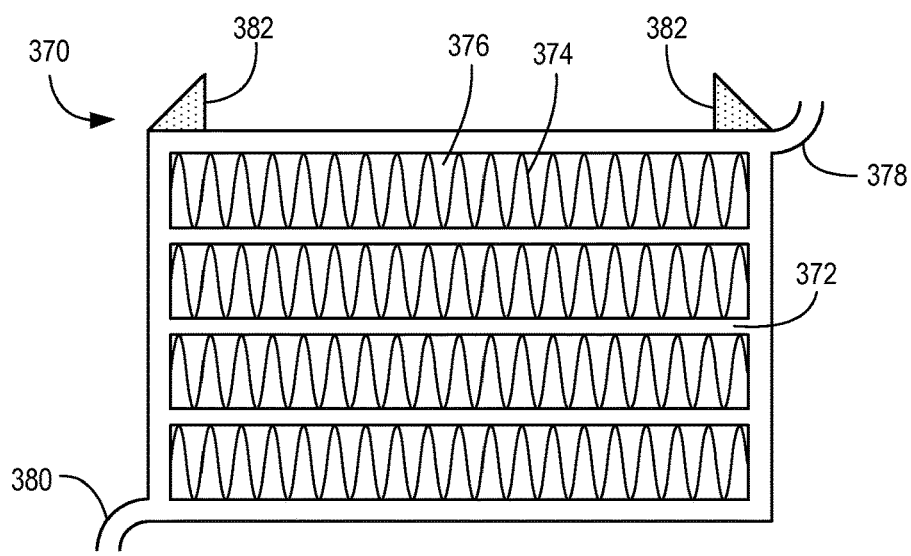
FIG. 3C depicts a partial perspective view of a radiator with fins coated with a catalyst layer in accordance with an implementation.

FIG. 3C depicts a partial perspective view of a radiator with fins coated with a catalyst layer in accordance with an implementation. A radiator 370 (which may be the same as radiator the 356 described with respect to FIG. 3B) may include spaced apart tubes 372 for the flow of a first fluid. The tubes are arranged horizontally through the radiator 370, and a series of corrugated plates 374 are inserted therebetween defining a pathway 376 for the flow of a second fluid transverse to the flow of the first fluid. The first fluid, such as antifreeze, is supplied from a source to the tubes 372 through an inlet 378. The antifreeze enters the radiator 370 at a relatively low temperature through the inlet 378, eventually leaves the radiator through an outlet 380, and may be recirculated. The second fluid may be ambient air that passes through the pathway 376 and exchanges heat with the first fluid passing through the tubes 372. The corrugated plates 374 may be coated with base metal catalyst layers (e.g., the catalyst layer 102 described with respect to FIG. 1) in order to convert or remove pollutants, such as ozone and volatile organic compounds, from the ambient air. In certain implementations, the radiator is provided with projections 382 (e.g., fins), which are non-heat exchange surfaces directed along the air-flow path. The projections 382 may be coated with base metal catalyst layers as disclosed herein.

Figure 4:
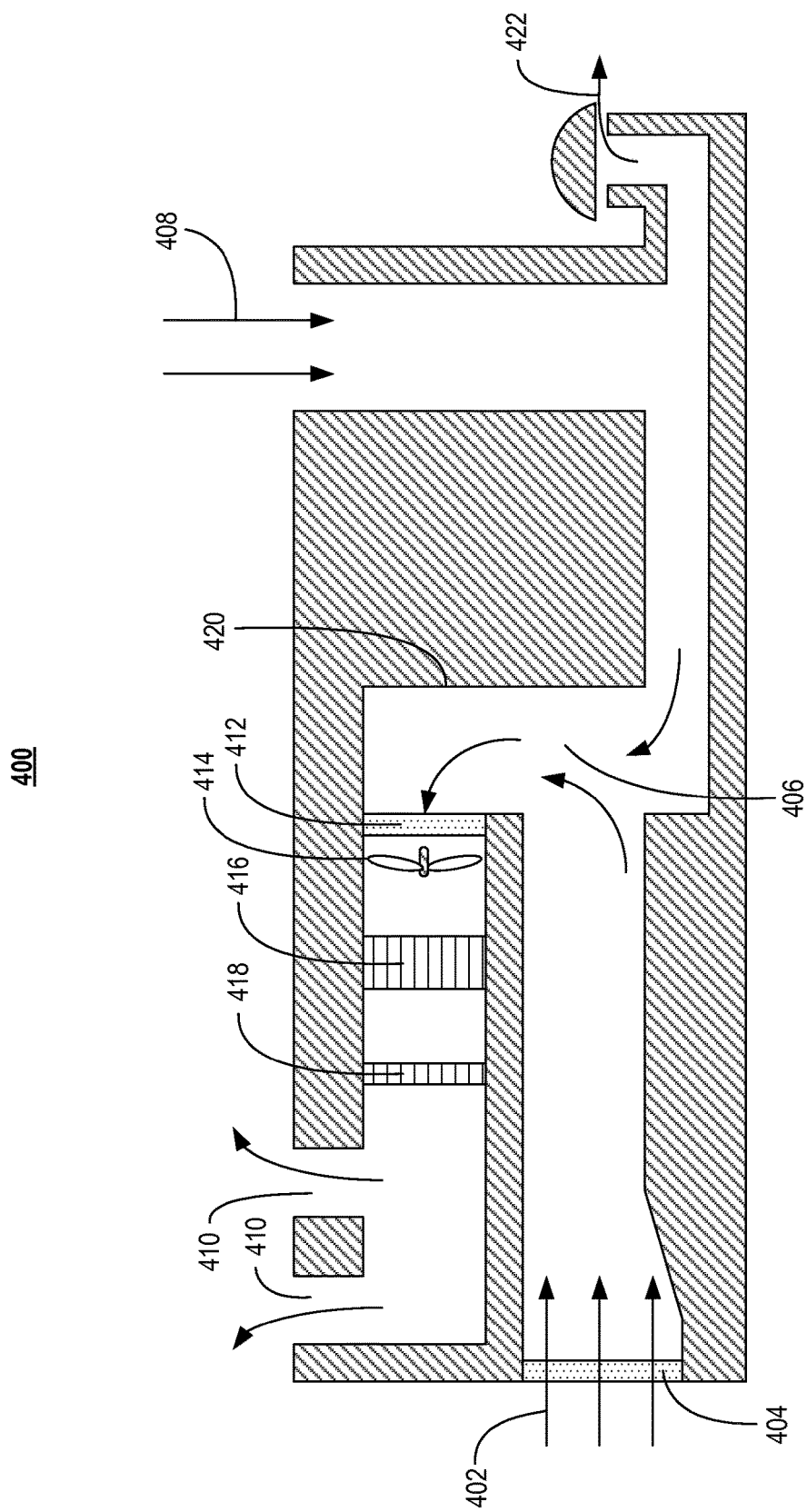
FIG. 4 depicts a heating, ventilation, and air-conditioning ("HVAC") system in accordance with an implementation.

FIG. 4 depicts a heating, ventilation, and air-conditioning ("HVAC") system in accordance with an implementation. HVAC system 400 may be, for example, located within the interior of a residential building, an office building, or any other closed structure for which ventilation is utilized. HVAC system 400 may be part of a house and may be partially located in a basement or crawl space of the house, with ducts arranged to provide ventilation to each room of the house.

Ambient air 402 enters HVAC system 400 through inlet filter 404. Inlet filter 404 may be an air filter to filter the air as it enters, or may be a screen used to prevent pests (e.g., insects and animals) from entering the HVAC system 400. One or more fans 414 may be utilized to produce a negative pressure within the HVAC system 400 that draws in ambient air 402. Recirculated air 408 from inside of the building also enters the HVAC system 400. The HVAC system 400 also includes a vent 422 to allow air to flow out of the HVAC system 400 in the case of overpressure.

The recirculated air 408 and ambient air 402 mix together in mixing chamber 406, which then passes through various HVAC components prior to entering the house through vents 410. Mixed air may first pass through a primary air filter 412, which may be a high-efficiency particular air (HEPA) filter. Air is forced through the air filter 412 by the fan 414, and then passes into a heating/cooling unit 416 that exchanges heat with the passing air. The heating/cooling unit 416 may be include power supplies and electrical connectivity to a thermostat located within the building. Additional components utilized by the heating/cooling unit 416 may include, for example, a humidifier and/or a drip pan for capturing and funneling out condensed water. The HVAC system 400 may also include an additional air filter 418 prior to delivering air through vents 410.

In some implementations, the HVAC system 400, or the components thereof, may act as a catalyst device housing by including base metal catalyst layers deposited on various surfaces throughout to convert or remove ozone, volatile organic compounds, and other pollutants from the ambient air prior to ventilating the building. For example, base metal catalysts may coat interior walls 420 of the mixing chamber 406, or any other walls within the HVAC system 400. In some implementations, filters 404, 412, and 418 may include catalyst layers along their surfaces such that air may pass through while simultaneously contacting the catalyst layers. In some implementations, the blades of fan 414 may be coated with a catalyst layer.

Figure 5:
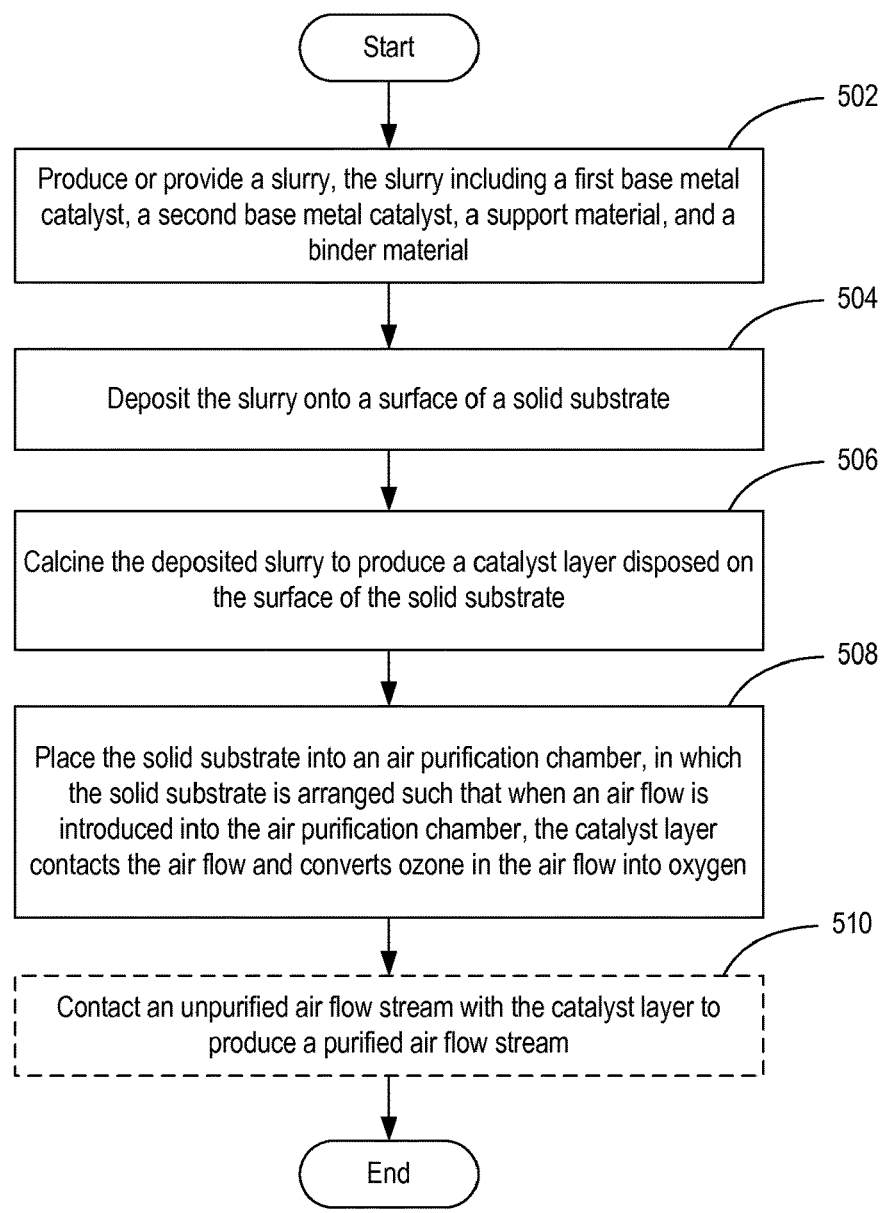
FIG. 5 shows an illustrative process for producing a catalyst device in accordance with an implementation.

FIG. 5 shows an illustrative process for producing a catalyst device in accordance with an implementation. The process begins at block 502, where a slurry is produced or provided. The slurry includes a first base metal catalyst, a second base metal catalyst, a support material, and a binder material.

In some implementations, the support is an oxygen donating support. As used herein, the term "oxygen donating" refers to a material that can donate oxygen to the adjacent surface of a catalyst material. The oxygen donating support and base metal catalysts can be prepared into solid phase mixtures through wet chemistry processes such as incipient wetness impregnation, co-precipitation, post-dip impregnation, deposition precipitation, single-pot, or other processes. These elements can also be added together with active base metal components during catalyst preparation without use of the pre-formed oxides as supports.

In some implementations, the support material for the first base metal catalyst can be comprised of one or more materials that selected from ceria, praseodymia, neodymia, lanthana, yttria, titania, zirconia, and combinations thereof. Examples of suitable oxygen donating supports comprise the rare earth oxides, particularly ceria. The oxygen donating support can include cerium oxide ($CeO_2$) in a form that exhibits oxygen donating properties.

In some implementations, the oxygen donating support contains other elements/components to improve the reducibility of the support and/or to stabilize the support against loss of surface area and structure integrity under high temperature hydrothermal aging condition. Such components can include Pr, Nd, Sm, Zr, Y, Si, Ti and La, which may be present in an amount of up to about 60 wt %. Thus, in further implementations, the ceria may be doped with up to about 90% by weight of one or more oxides of Pr, Nd, Sm, Zr, Y and La. In further implementations, the ceria is doped with one or more oxides of these elements in an amount less than or equal to about 60 wt %, or from about 1 to about 50 wt %. In one implementation, the oxygen donating support is substantially free of oxides of aluminum. In one or more implementations, the support comprises a mixture of ceria and zirconia, and the ratio of Ce/Zr is no less than 4:1.

In some implementations, the first base metal catalyst is supported on an oxygen donating support material that is substantially free of alumina. The oxygen donating support material may include one or more of ceria ($CeO_2$), praseodymia ($Pr_2O_3$), neodymia ($Nd_2O_3$), lanthana ($LaO_2$), yttria ($YtO_2$), titania ($TiO_2$), and combinations thereof. The oxygen donating support material may also include mixtures of these with other oxide materials such as with zirconia ($ZrO_2$). Thus, the oxygen donating support may include composite oxides or mixed oxides of two or more thereof (such as $CeZrO_2$ mixed oxides and $TiZrO_2$ mixed oxides).

The oxygen donating support material may also be stabilized. Stabilizers may be selected from zirconium (Zr), lanthanum (La), yttrium (Yt), praseodymium (Pr), neodymium (Nd), and oxide thereof, a composite oxide or mixed oxide of any two or more thereof or at least one alkaline earth metal (e.g., barium (Ba)).

In some implementations, the oxygen donating support comprises a mixture of ceria and zirconia. Without intending to be bound by theory, it is believed that the zirconia aids in long term aging by preserving stability of the catalyst. Additionally, zirconia offers a less expensive alternative to ceria.

It has been observed that the activity of the catalyst is proportional to the Ce/Zr ratio. Any ratio of Ce/Zr is possible, however, as the amount of ceria decreases (i.e., the higher the content of zirconia), the lower the activity of the catalyst. In some implementations, the ratio of Ce/Zr is no less than 4:1. In other words, the oxygen donating support can comprise 80% ceria and 20% zirconia, 75% ceria and 25% zirconia, 70% ceria and 30% zirconia, 65% ceria and 35% zirconia, 60% ceria and 40% zirconia, 65% ceria and 45% zirconia, 50% ceria and 50% zirconia, 40% ceria and 60% zirconia, 30% ceria and 70% zirconia, 20% ceria and 80% zirconia, 10% ceria and 90% zirconia, 0% ceria and 100% zirconia. In one implementation, the oxygen donating support comprises an equivalent amount of ceria and zirconia.

In one or more implementations, the oxygen donating support includes at least 50% by weight of ceria. In a specific implementation, the oxygen donating support includes at least 99% by weight of ceria.

In some implementations, the catalyst is prepared by incipient wetness impregnation. With incipient wetness impregnation, a solution of base metal catalyst precursors is dispensed into a well-mixed powder bed containing the oxygen donating support (e.g., ceria, ceria/zirconia, or titania). The powder is then calcined at about 500° C. after the first base metal catalyst is added, followed sequentially by the dispensing and calcining of the at least one second base metal catalyst. Alternatively, a solution containing both base metal catalyst precursors together can be dispensed into the well-mixed powder bed containing the support.

In one implementation, when more than one base metal catalyst is present, one of the base metal catalysts may act as a base metal promoter. As used herein, the term "promoter" refers to a substance that when added into a catalyst, increases the activity of the catalyst.

In implementations relating to supported base metal formulations, pre-made supports may be used for impregnation of the solution of active base metal or combination of base metals. The resulting catalyst can then be mixed with a suitable binder. Examples of a suitable binder include alumina sol, Boehmite, silica sol, titania sol, zirconium acetate, and colloidal ceria sol. Alternatively, the resulting catalyst may be calcined first, and then mixed with binder to make a suitable slurry for coating onto a substrate. In one implementation, the first base metal catalyst deposited on the oxygen donating support may be mixed with other based metal catalysts deposited on another support to make a slurry for coating onto the substrate.

For a single-pot synthesis, the support, base metal catalyst precursors, binder, and any inert materials (e.g., added to increase washcoat porosity) may be mixed together to form a slurry.

In some implementations, a base metal precursor solution (e.g. Cu and Mn nitrate) is slowly added to a suspension of support material, while the pH is regulated (controlled and adjusted) to keep the pH between 8 to 10 through the addition of a base. The pH is adjusted so that deposition of the base metal on and over the surface of the support material occurs. The resulting material may then be used for making a slurry.

Returning to FIG. 5, at block 504 the slurry is deposited onto a surface of a solid substrate (e.g., substrate 104). The slurry may be, for example, sprayed onto the solid substrate, dip-coated onto the solid substrate, or directly deposited onto the solid substrate.

At block 506, the deposited slurry is calcined to produce a catalyst layer (e.g., catalyst layer 102) disposed on the surface of the solid substrate. In some implementations, the coated slurry is dried at about 120° C. for about 2 hours and calcined at a temperature ranging from about 300° C. to about 1000° C. In some implementations, the slurry is calcined at a temperature ranging from about 400° to about 950° C. In some implementations, the catalyst is calcined at a temperature ranging from about 450° C. to about 500° C.

In some implementations, a substrate is pre-coated with the slurry containing that catalyst, support, binder and other inert materials (e.g., alumina added for porosity). After drying and calcination, the coated substrate cores are dipped in a solution containing the base metal catalyst precursors. The completed cores are then dried and calcined at 500° C. to produce the final catalyst layer.

At block 508, the solid substrate is placed into an air purification chamber, such as any of the chambers described herein. The solid substrate is then arranged such that when an air flow is introduced into the air purification chamber, the catalyst layer contacts the air flow and converts ozone in the air flow into oxygen. In certain implementations, other pollutants in the air flow may be converted into harmless or less harmful chemical species upon contact with the catalyst layer.

At block 510, an unpurified air flow stream is contacted with the catalyst layer to produce a purified air flow stream. Block 510 may be performed downstream, for example, by a user of the catalyst device, and not necessarily as part of the production process outlined in blocks 502, 504, 506, and 508.

It should be understood that the above steps of the flow diagrams of FIG. 5 may be executed or performed in any order or sequence not limited to the order and sequence shown and described. Also, some of the above steps of the flow diagrams of FIG. 5 may be executed or performed substantially simultaneously, where appropriate.

Figure 6:
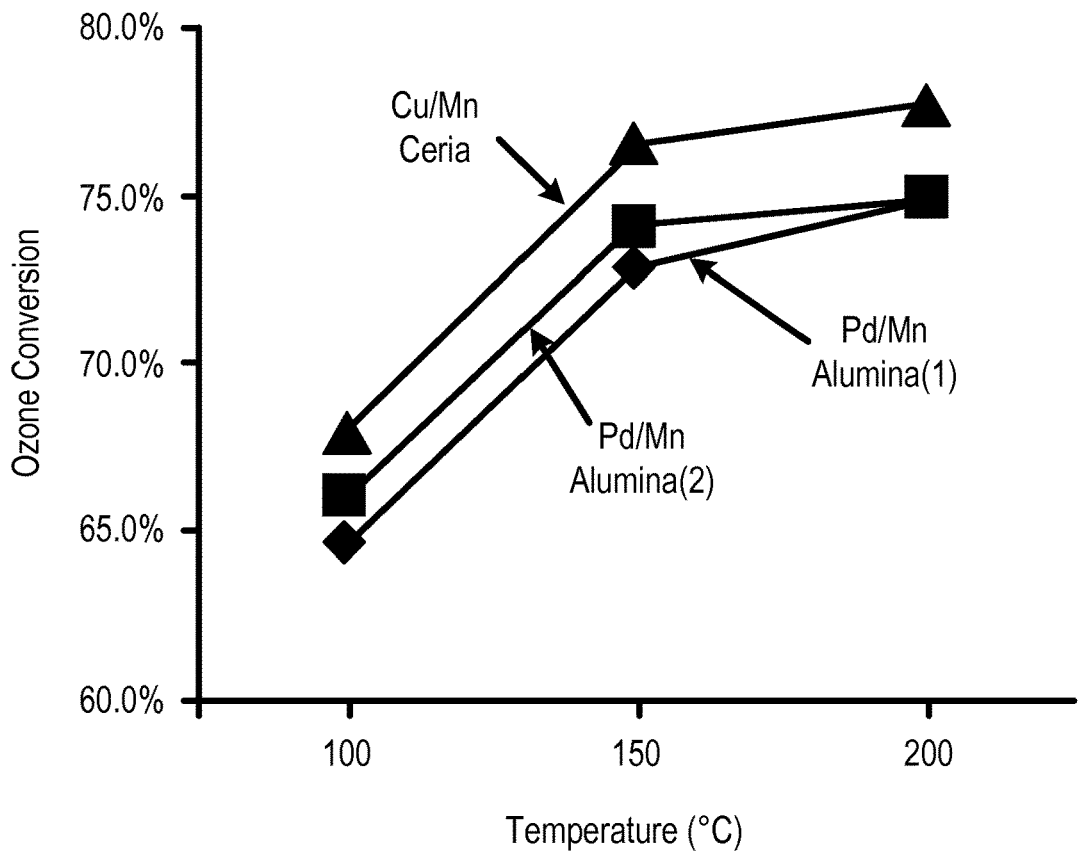
FIG. 6 is a plot depicting ozone conversion for various compositions.

FIG. 6 is a plot depicting ozone conversion for various compositions. Plot 600 shows an ozone conversion comparison of a base metal catalyst (copper and manganese) to palladium/manganese-based catalysts currently used in aircraft environmental control systems. At each testing temperature, 100° C., 150° C., and 200° C., respectively, the copper/manganese/ceria catalyst appears to outperform both platinum/manganese/alumina and platinum/manganese/silica catalysts in terms of ozone conversion. While the copper/manganese catalyst is loaded on the ceramic support at 2.75 g/in³ and the Pd/Mn catalyst is at 1.06 g/in³, a high density of ceria relative to the alumina/silica will result in a coating of similar thickness. The coating thickness is of particular interest because of pressure drop restrictions on the ozone/VOC converter systems in aircraft environmental control systems. Thus, it is likely that the higher density of material (and higher surface area) of the base metal catalyst may contribute to the increased performance over conventional precious metal catalysts.

Figures 7A, 7B, 7C:
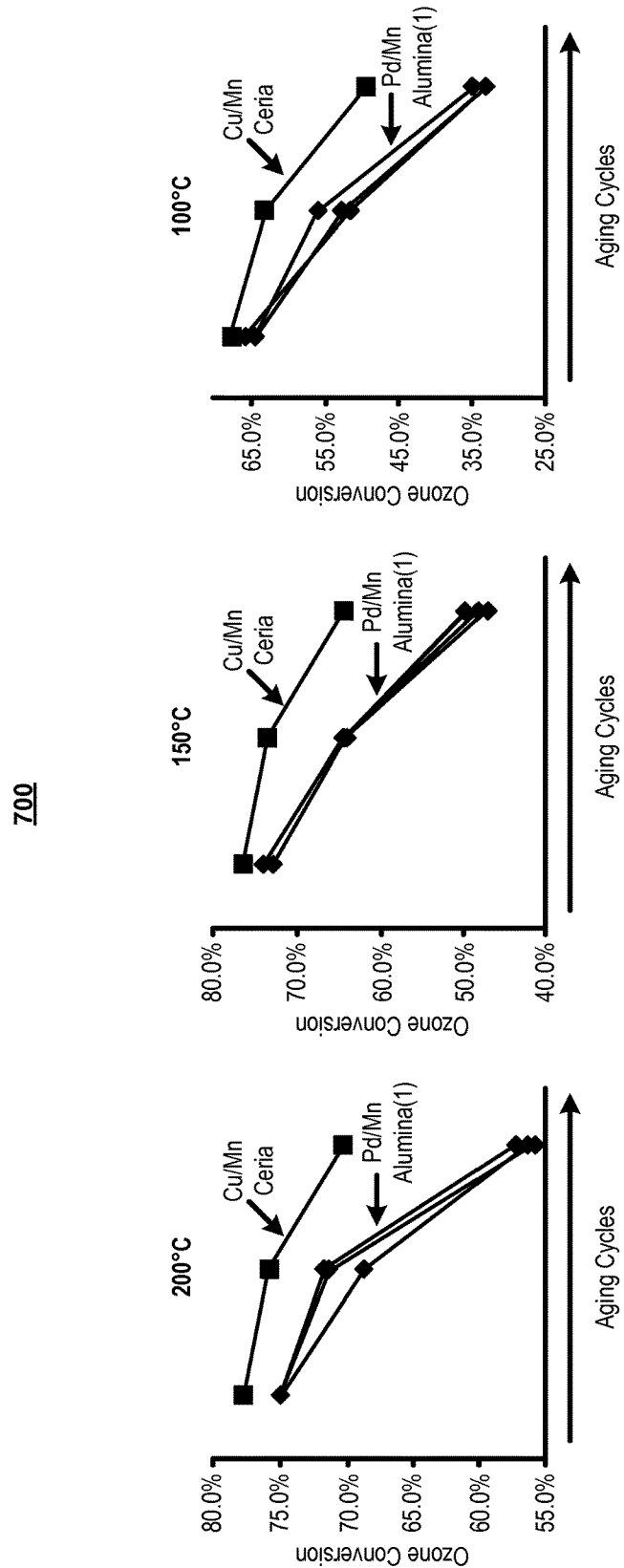
FIGS. 7A-7C are plots showing the effects of aging cycles on various compositions.

FIGS. 7A-7C are plots showing the effects of aging cycles on various compositions. Hydraulic fluid, for example, is a known contaminant in aircraft bleed air systems that can be exposed to the aircraft ozone/VOC catalyst. Previous work with field aged aircraft ozone/VOC converters has indicated phosphorous loading as a possible poison for decreasing the aged ozone conversion efficiencies of conventional Pd/Mn catalysts. A phosphate ester based hydraulic fluid was the used to rapidly expose the catalyst to high concentrations of phosphorus in an attempt to artificially age the catalyst samples. FIGS. 7A-7C demonstrate the ozone conversion efficiency after exposure to artificial aging conditions of an exemplary base metal catalyst (Cu/Mn on ceria) relative to a Pd/Mn catalyst. At each testing temperature, namely 200° C., 150° C., and 100° C., the Cu/Mn catalyst outperforms the Pd/Mn catalyst and maintains high conversion with subsequent aging cycles.

EXAMPLES

The following examples are set forth to assist in understanding the implementations described herein and should not be construed as specifically limiting the implementations described and claimed herein. Such variations, including the substitution of all equivalents now known or later developed, which would be within the purview of those skilled in the art, and changes in formulation or minor changes in experimental design, are to be considered to fall within the scope of the implementations incorporated herein.

Example 1

Manganese and copper nitrate salts were mixed with water to make a solution for the incipient wetness impregnation of cerium oxide. The cerium oxide was then impregnated with the solution and then dried for two hours at 110° C. and calcined at 500° C. for three hours. The manganese and copper loadings in the impregnated catalyst are equivalent to 10 wt % of $MnO_2$ and 10 wt % of CuO on ceria. The impregnated sample was then mixed with water, an alumina sol binder (5 wt %), and alumina (15%) to form a slurry that contained about 42 wt % of solids. The pH of the slurry was adjusted to 4.0 with nitric acid. The slurry was then milled to a particle size suitable for washcoating. A catalyst layer was then prepared by washcoating the slurry onto a cordierite substrate with a cell density of 400 cpsi. After washcoating, the catalyst layer was then dried at 120° C. for 2 hours and calcined at 500° C. for 2 hours. The catalyst layer loading was 2.75 g/in³.

Example 2

Manganese and copper nitrate salts were mixed with water to make a solution for the incipient wetness impregnation of cerium oxide. The cerium oxide was then impregnated with the solution and then dried for two hours at 110° C. and calcined at 500° C. for three hours. The manganese and copper loadings in the impregnated catalyst were equivalent to 5 wt % of $MnO_2$ and 10 wt % of CuO on ceria. The impregnated sample was then mixed with water and an alumina sol binder (5 wt %) to form a slurry that contained about 42 wt % of solids. The pH of the slurry was adjusted to 4.5 with nitric acid. The slurry was then milled to a particles size suitable for washcoating. A catalyst layer was then prepared by washcoating the slurry onto a cordierite substrate with a cell density of 400 cpsi. After washcoating, the catalyst layer was then dried at 120° C. for 2 hours and calcined at 500° C. for 2 hours. The catalyst layer loading was 1.70 g/in³.

Example 3

The catalyst layer in this example was prepared following the same procedure described for Example 2, except the support used was a ceria-zirconia material that contained 80 wt % of ceria.

Example 4

The catalyst layer in this example was prepared following the same procedure described for Example 2, except the support used was a ceria-zirconia material that contained 45 wt % of ceria.

Example 5

The monolith catalyst in this example was prepared following the same procedure described for Example 2, except the support used was a ceria-zirconia material that contained 12.5 wt % of ceria.

Example 6

The monolith catalyst in this example was prepared following the same procedure described for Example 2, except the support used was titania.

Example 7

The monolith catalyst in this example was prepared following the same procedure described for Example 2, except the catalyst layer loading was 2.75 g/in$^3$.

Example 8

Manganese and copper nitrate salts were mixed with water to make a solution. This solution was added to a suspension of cerium oxide held at 80° C. During the addition, the pH of the suspension was held between 8 to 10 with a solution of sodium hydroxide. The resulting powder was then filtered, washed with water, dried for two hours at 110° C., and then calcined for three hours at 500° C. The manganese and copper loadings were equivalent to 5 wt % of MnO$_2$ and 10 wt % of CuO on ceria. The sample was then mixed with water and an alumina sol binder (5 wt %) to form a slurry that contained about 42 wt % of solids. The pH of the slurry was adjusted to 4.5 with nitric acid. The slurry was then milled to a particles size suitable for washcoating. A catalyst layer was then prepared by washcoating the slurry onto a cordierite substrate with a cell density of 400 cpsi. After washcoating, the catalyst layer was then dried at 120° C. for 2 hours and calcined.

Example 11

The monolith catalyst in the example was prepared following the same procedure described for Example 2, except the copper loading in the impregnated catalyst was equivalent to 20 wt % CuO.

The use of the terms "a," "an," "the," and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Reference throughout this specification to "one implementation," "certain implementations," "one or more implementations" or "an implementation" means that a particular feature, structure, material, or characteristic described in connection with the implementation is included in at least one implementation of the present disclosure. Thus, the appearances of the phrases such as "in one or more implementations," "in certain implementations," "in one implementation," or "in an implementation" in various places throughout this specification are not necessarily referring to the same implementation of the present disclosure. Furthermore, the particular features, structures, materials, or characteristics may be combined in any suitable manner in one or more implementations.

Although the implementations disclosed herein have been described with reference to particular implementations, it is to be understood that these implementations are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents, and the above-described implementations are presented for purposes of illustration and not of limitation.

What is claimed is:

1. A catalyst device for purifying an air supply of ozone and volatile organic compounds, the catalyst device comprising:
    a housing;
    a solid substrate disposed within the housing; and
    a catalyst layer disposed on the substrate, wherein the catalyst layer comprises:
        a first base metal catalyst at a first mass percent;
        a second base metal catalyst at a second mass percent; and
        a support material impregnated with at least one of the first base metal catalyst or the second base metal catalyst, wherein the support material is an oxygen donating support.

2. The catalyst device of claim 1, wherein the catalyst layer is to remove one or more of ozone, carbon dioxide, carbon monoxide, nitrous oxide, amines, sulfur compounds, thiols, chlorinated hydrocarbons, or volatile organic compounds from an unpurified air supply.

3. The catalyst device of claim 1, wherein the catalyst layer is to convert ozone to oxygen.

4. The catalyst device of claim 1, wherein the first base metal catalyst and the second base metal catalyst each comprise at least one of Cu, Fe, Co, Ni, Cr, Mn, Nd, Ba, Ce, La, Pr, Mg, Ca, Zn, Nb, Zr, Mo, Sn, Ta, or Sr.

5. The catalyst device of claim 1, wherein the first base metal catalyst is copper oxide, and wherein the first mass percent is between about 1% and about 30%.

6. The catalyst device of claim 1, wherein the second base metal catalyst is manganese oxide, and wherein the second mass percent is between about 1% and about 30%.

7. The catalyst device of claim 1, wherein the solid substrate is a nonwoven filter, a paper filter, a ceramic filter, a fibrous filter, a metallic foam substrate, a ceramic foam substrate, a polymer foam substrate, a metallic honeycomb substrate, a ceramic honeycomb substrate, a paper honeycomb substrate, or a ceramic fiber honeycomb substrate.

8. The catalyst device of claim 1, wherein the solid substrate is a surface of a heat exchanger, a radiator, a heating core, a condenser, a heating, ventilation, and air conditioning (HVAC) duct, an air filter, or a louver surface.

9. The catalyst device of claim 1, further comprising:
an inlet port configured to receive unpurified air into an interior of the housing; and
an outlet port configured to deliver purified air from the housing,
wherein the catalyst device is configured to contact the unpurified air with the catalyst layer, wherein ozone present in the unpurified air is converted to oxygen upon contact with the catalyst layer, wherein the unpurified air has an initial ozone content, and wherein the purified air has a final ozone content that is less than about 20% of the initial ozone content.

10. The catalyst device of claim 9, wherein the catalyst device is incorporated into a device selected from a group consisting of: an aircraft environmental control system, an aircraft fuel tank inerting system, an automobile ventilation unit, a building HVAC system, and a portable air purifier.

11. A method for purifying an air flow stream, the method comprising:
contacting an unpurified air flow stream with a catalyst layer to produce a purified air flow stream, wherein:
the unpurified air flow stream contains a first ozone content,
the purified air flow stream contains a second ozone content that is less than about 20% of the first ozone content, and
the catalyst layer comprises a first base metal catalyst, a second base metal catalyst, and a support material, wherein the support material is an oxygen donating support, wherein the catalyst layer is disposed on a solid substrate, and wherein the solid substrate is selected from a group consisting of: a heat exchanger surface, a component of an automobile ventilation unit, a component of an aircraft environmental control system, a component of an aircraft fuel tank inerting system, a component of an HVAC system, and a component of a portable air purifier.

12. The method of claim 11, wherein contacting the unpurified air flow stream with the catalyst layer removes at least one of ozone, carbon dioxide, carbon monoxide, nitrous oxide, amines, sulfur compounds, thiols, chlorinated hydrocarbons, or a volatile organic compound from the unpurified air flow stream to produce the purified air flow stream.

13. The method of claim 11, wherein the first base metal catalyst and the second base metal catalyst each comprise at least one of Cu, Fe, Co, Ni, Cr, Mn, Nd, Ba, Ce, La, Pr, Mg, Ca, Zn, Nb, Zr, Mo, Sn, Ta, or Sr.

14. The method of claim 11, wherein the first base metal catalyst is copper oxide, and wherein a first mass percent of the first base metal catalyst in the catalyst layer is between about 1% and about 30%.

15. The method of claim 11, wherein the second base metal catalyst is manganese oxide, and wherein a second mass percent of the second base metal catalyst in the catalyst layer is between about 1% and about 30%.

16. An aircraft environmental control system comprising:
the catalyst device of claim 1;
an inlet to receive unpurified air into the housing of the catalyst device, wherein the unpurified air is at least one of jet engine bleed air or recirculated aircraft cabin air; and
an outlet to deliver ozone-reduced air from the housing and into an interior of the aircraft, wherein the ozone-reduced air is produced as a result of contact between the unpurified air and the catalyst layer of the catalyst device.

17. A method for producing a catalyst device, the method comprising:
providing a slurry, the slurry comprising a first base metal catalyst, a second base metal catalyst, a support material, and a binder material, wherein the support material is an oxygen donating support;
depositing the slurry onto a surface of a solid substrate;
calcining the deposited slurry to produce a catalyst layer disposed on the surface of the solid substrate; and
placing the solid substrate into an air purification chamber, wherein the solid substrate is arranged such that when an air flow is introduced into the air purification chamber, the catalyst layer contacts the air flow and converts ozone in the air flow into oxygen.

18. A catalyst device for purifying an air supply of ozone and volatile organic compounds, the catalyst device comprising:
a housing;
a solid substrate disposed within the housing; and
a catalyst layer disposed on the substrate, wherein the catalyst layer comprises:
a first base metal catalyst at a first mass percent;
a second base metal catalyst at a second mass percent; and
a support material impregnated with at least one of the first base metal catalyst or the second base metal catalyst,
wherein:
the support material has a surface area of at least about 50 $m^2/g$,
the support material has a pore volume of about 0.1 cc/g to about 10 cc/g,
the support material comprises a material selected from a group consisting of ceria, alumina, titania, silica, zirconia, carbons, metal organic framework, clay, zeolites, and combinations thereof, and
a density of the catalyst layer is between about 0.015 $g/in^2$ and about 0.062 $g/in^2$.

19. A method for purifying an air flow stream, the method comprising:
contacting an unpurified air flow stream with a catalyst layer to produce a purified air flow stream, wherein:
the unpurified air flow stream contains a first ozone content,
the purified air flow stream contains a second ozone content that is less than about 20% of the first ozone content, and
the catalyst layer comprises a first base metal catalyst, a second base metal catalyst, and a support material, wherein:
the support material has a surface area of at least about 50 $m^2/g$,
the support material has a pore volume of about 0.1 cc/g to about 10 cc/g,
the support material comprises a material selected from a group consisting of ceria, alumina, titania, silica, zirconia, carbons, metal organic framework, clay, zeolites, and combinations thereof, a density of the catalyst layer is between about 0.015 g/in² and about 0.062 g/in², the catalyst layer is disposed on a solid substrate, and the solid substrate is selected from a group consisting of: a heat exchanger surface, a component of an automobile ventilation unit, a component of an aircraft environmental control system, a component of an aircraft fuel tank inerting system, a component of an HVAC system, and a component of a portable air purifier.

20. A method for producing a catalyst device, the method comprising:

providing a slurry, the slurry comprising a first base metal catalyst, a second base metal catalyst, a support material, and a binder material, wherein:

the support material has a surface area of at least about 50 m²/g, the support material has a pore volume of about 0.1 cc/g to about 10 cc/g, the support material comprises a material selected from a group consisting of ceria, alumina, titania, silica, zirconia, carbons, metal organic framework, clay, zeolites, and combinations thereof, and a density of the catalyst layer is between about 0.015 g/in² and about 0.062 g/in²;

depositing the slurry onto a surface of a solid substrate;

calcining the deposited slurry to produce a catalyst layer disposed on the surface of the solid substrate; and placing the solid substrate into an air purification chamber, wherein the solid substrate is arranged such that when an air flow is introduced into the air purification chamber, the catalyst layer contacts the air flow and converts ozone in the air flow into oxygen.

\* \* \* \* \*